(12) United States Patent
Muhamad et al.

(10) Patent No.: US 11,761,430 B2
(45) Date of Patent: Sep. 19, 2023

(54) BEARING SUPPORT ARRANGEMENT FOR A WIND TURBINE, WIND TURBINE AND METHOD FOR MOUNTING A BEARING SUPPORT ARRANGEMENT

(71) Applicant: Nordex Energy SE & Co. KG, Hamburg (DE)

(72) Inventors: Ibrahim Muhamad, Rostock (DE); Gerald Festner, Klein Krams (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/534,195

(22) Filed: Nov. 23, 2021

(65) Prior Publication Data

US 2022/0163016 A1 May 26, 2022

(30) Foreign Application Priority Data

Nov. 23, 2020 (EP) .................................... 20209182

(51) Int. Cl.
*F03D 80/70* (2016.01)
*F16C 35/04* (2006.01)
*F16C 35/077* (2006.01)

(52) U.S. Cl.
CPC .............. *F03D 80/70* (2016.05); *F16C 35/04* (2013.01); *F16C 35/042* (2013.01); *F16C 35/077* (2013.01); *F05B 2240/50* (2013.01); *F16C 2360/31* (2013.01)

(58) Field of Classification Search
CPC ...... F16C 35/04; F16C 35/042; F16C 35/067; F16C 35/077; F16C 2226/16; F16C 2360/31; F03D 80/70; F05B 2240/50
See application file for complete search history.

(56) References Cited

U.S. PATENT DOCUMENTS

| 2006/0171623 A1 | 8/2006 | Brandenstein et al. |
| 2008/0056634 A1 | 3/2008 | Hewitt et al. |
| 2011/0142598 A1 | 6/2011 | Andersen et al. |
| 2012/0025538 A1 | 2/2012 | Luneau et al. |
| 2012/0055024 A1 | 3/2012 | Kawano et al. |

(Continued)

FOREIGN PATENT DOCUMENTS

| DE | 38 39 624 A1 | 5/1990 |
| DE | 10 2004 062 117 A1 | 7/2006 |

(Continued)

OTHER PUBLICATIONS

Extended European search report of the European Patent Office dated May 19, 2021 in EP 20 209 182.3 on which the claim of priority is based.

*Primary Examiner* — James Pilkington
(74) *Attorney, Agent, or Firm* — Walter Ottesen, P.A.

(57) ABSTRACT

A bearing support arrangement for a wind turbine includes a support structure and a bearing housing. The bearing housing is arranged within the support structure. The arrangement further includes a bearing radially supported by the bearing housing. A rotor shaft is radially supported by the bearing and a removable wedge is arranged between the support structure and the bearing housing to clamp the bearing between the rotor shaft and the bearing housing. A method for mounting the bearing support arrangement for a wind turbine is also disclosed as is a wind turbine incorporating the bearing support arrangement.

18 Claims, 6 Drawing Sheets

(56) References Cited

U.S. PATENT DOCUMENTS

| | | |
|---|---|---|
| 2012/0237152 A1 | 9/2012 | Wheals |
| 2014/0010664 A1 | 1/2014 | Markussen |
| 2014/0072446 A1 | 3/2014 | Markussen |
| 2015/0125104 A1 | 5/2015 | Kullin et al. |
| 2016/0090966 A1 | 3/2016 | Kullin et al. |
| 2017/0074317 A1 | 3/2017 | Reichert et al. |
| 2017/0159704 A1 | 6/2017 | Wheals |
| 2018/0266399 A1* | 9/2018 | Wu .................. F03D 1/06 |
| 2018/0347625 A1 | 12/2018 | Reichert et al. |
| 2019/0107146 A1 | 4/2019 | Meyer |
| 2019/0113073 A1 | 4/2019 | Kullin et al. |
| 2019/0301436 A1 | 10/2019 | Trede et al. |
| 2021/0277940 A1* | 9/2021 | Dobashi ............ F16C 35/073 |

FOREIGN PATENT DOCUMENTS

| | | |
|---|---|---|
| DE | 10 2008 052 412 A1 | 4/2010 |
| DE | 10 2015 218 228 A1 | 3/2016 |
| DE | 10 2017 125 550 A1 | 5/2019 |
| DE | 10 2018 002 553 A1 | 10/2019 |
| EP | 2 381 097 A1 | 10/2011 |
| EP | 2 538 079 A2 | 12/2012 |
| EP | 2 781 740 A2 | 9/2014 |
| EP | 2 871 376 A1 | 5/2015 |
| EP | 3 144 550 A1 | 3/2017 |
| EP | 2 478 237 B1 | 12/2017 |
| EP | 3 309 387 A1 | 4/2018 |
| EP | 3 405 689 A1 | 11/2018 |
| WO | 2004/051104 A1 | 6/2004 |
| WO | 2009/080712 A2 | 7/2009 |
| WO | 2011/033256 A1 | 3/2011 |
| WO | WO2020/039668 * | 2/2020 |

* cited by examiner

BEARING SUPPORT ARRANGEMENT FOR A WIND TURBINE, WIND TURBINE AND METHOD FOR MOUNTING A BEARING SUPPORT ARRANGEMENT

CROSS REFERENCE TO RELATED APPLICATION

This application claims priority of European patent application no. 20 209 182.3, filed Nov. 23, 2020, the entire content of which is incorporated herein by reference.

TECHNICAL FIELD

The disclosure relates to a bearing support arrangement for a wind turbine and a wind turbine having such a bearing support arrangement. The disclosure further relates to a method for mounting a bearing support arrangement for a wind turbine.

BACKGROUND

A wind turbine may include a rotor that includes a rotor hub having multiple rotor blades. The rotor blades transform wind energy into a rotational torque that drives a generator via a drive train. The drive train may include a rotor shaft, a gearbox, a coupling, a rotor brake and other components. The generator, the gearbox and the other components may be mounted within a nacelle that is positioned on top of a tower.

US 2014/0010664 and US 2014/0072446 relate to a support structure for bearings that allows the rotor shaft to rotate about the rotor axis. The support structure may be a housing fixed on a base, which can be coupled to a tower.

US 2012/0025538 relates to a support structure for bearings with a first portion sized to receive a rotor shaft therethrough and a second portion which is configured to be coupled to a tower, wherein the second portion is integrally formed with the first portion.

SUMMARY

It is desirable to provide a bearing support arrangement for a wind turbine that enables reliable operation and maintenance.

Embodiments of the disclosure provide a bearing support arrangement for a wind turbine. According to an embodiment, the bearing support arrangement includes:
  a support structure;
  a bearing housing, the bearing housing being arranged inside the support structure;
  a bearing, the bearing being radially supported by the bearing housing;
  a rotor shaft, the rotor shaft being radially supported by the bearing;
  a removable wedge, the wedge being arranged between the support structure and the bearing housing to clamp the bearing between the rotor shaft and the bearing housing.

The bearing support arrangement allows a reliable clamping of the bearing between the rotor shaft and the bearing housing. The wedge is configured to apply a radial force on the bearing housing and on the support structure to clamp the bearing. The wedge presses the support structure and the bearing housing apart from each other. Thereby a radial force is exerted on the bearing against the rotor shaft. An easy mechanical tensioning of the bearing to the support structure is possible. The bearing is centered relatively to the rotor shaft due to the wedge which is arranged between the support structure and the bearing housing. Furthermore larger manufacturing tolerances in the support structure, the bearing housing, the bearing and/or the rotor shaft are acceptable. The manufacturing of the components can be more reliable and cost effective because very narrow tolerances are avoidable. Furthermore a heating of the components before assembly is avoidable.

The removable arrangement of the wedge allows to demount the bearing, the rotor shaft and other components in case of damage or for maintenance. Dismantling the individual components of the bearing support arrangement is simplified. For example, the bearing housing, the bearing and the rotor shaft form an assembly which can be removed if the wedge is released. In particular, it is possible to remove this whole assembly in one piece.

According to embodiments, the support structure includes two separate parts, an upper part which surrounds the bearing housing, and a lower part which supports the upper part. The lower part may for example be a base or a machine support (also called machine frame or base frame). The upper part and the lower part are fixed together. The lower part for example is rotatably mounted on top of a tower of the wind turbine.

According to further embodiments, the support structure forms a machine frame, for which the upper part is integrally formed with the lower part and extends from the lower part. Such a machine frame thus for example forms a single, unitary component. Such a machine frame may be realized as one single casting and is for example rotatably mounted on top of the tower.

According to embodiments, the wedge is not completely removed from the support structure and the bearing housing to demount the arrangement. For example, it is sufficient to release and/or shift the wedge to reduce the radial clamping force such that the fixing of the bearing housing relative to the support structure is loose. Therefore, in the context of this disclosure, the term "remove" can mean: a complete removal, a partial removal, a displacement to reduce the clamping forces and/or a displacement of the wedge relative to the support structure and/or the bearing housing.

According to further embodiments, the wedge is ring shaped and surrounds the bearing. In particular, the wedge surrounds the bearing and the bearing housing is located between the wedge and the bearing. For example, the wedge is configured rotationally symmetrical. For example, the wedge can be manufactured in a lathe with narrow tolerances. A ring shaped wedge provides good centering of the bearing and a uniform preload of the bearing.

According to further embodiments, the wedge includes a mounting interface for removable fixing of the wedge to the bearing housing and/or the support structure. For example, the wedge is mounted to the bearing housing via the mounting interface. Alternatively or in addition, the wedge is mounted to the support structure via the mounting interface.

According to embodiments, the mounting interface includes a radial projecting part that reaches to the bearing housing and/or the support structure. This allows an overlap of the wedge and the bearing housing and/or the support structure along the longitudinal direction. Thus, a fixing along the longitudinal direction is possible. Therefore, the fixing is along a direction which is transverse to the radial direction along which the clamping of the bearing is realized.

According to further embodiments, the bearing support arrangement includes fixing elements, for example screws, studs, nuts and/or bolts, for removable fixing of the wedge to the bearing housing and/or the support structure. The fixing elements for example interact with the mounting interface to provide a holding and retention force along the longitudinal axis. Thus the wedge can be tensioned between the support structure and the bearing housing by moving along the longitudinal direction while fastening the fixing elements. Due to the outer shape of the wedge this induces the radial force and clamping of the bearing.

According to further embodiments, a radial thickness of the wedge decreases along a longitudinal axis of the support structure. For example, the radial thickness of the wedge decreases along the longitudinal axis from an outer side of the support structure towards an inner side of the support structure. For example, one outer side faces the rotor and another outer side faces the generator in ready-to-operate condition. The inner side is located between the two outer sides along the longitudinal direction. Accordingly, the wedge includes a conical cross section at least partly along the longitudinal axis. This allows an easy push in and pull out of the wedge and allows sufficient clamping of the bearing.

According to further embodiments, the bearing support arrangement includes a cone ring. The cone ring is arranged radially between the bearing housing and the wedge. A radial thickness of the cone ring increases along a longitudinal axis from both outer sides of the support structure towards an inner side of the support structure. The cone ring allows an easy and reliable mounting and disassembly of the bearing support arrangement without the need for major adjustments to the bearing housing.

According to further embodiments, one of the bearing housing and the support structure includes a contact surface which is in contact with the wedge and which has an inclined orientation with respect to the longitudinal axis. The inclined orientation of the contact surface allows an easy push in and pull out of the wedge which slides along the contact surface. Furthermore the contact surface allows a reliable transmission of the radial forces.

According to further embodiments, the bearing support arrangement includes a second bearing in addition to the first bearing described above. The second bearing is radially supported by the bearing housing. The bearing support arrangement includes a second removable wedge in addition to the first removable wedge described above. The second wedge is arranged between the support structure and the bearing housing to clamp the second bearing between the rotor shaft and the bearing housing. Providing two bearings and two corresponding wedges allows a reliable support of the rotor shaft. Thereby compensation of radial assembly play and/or radial manufacture tolerances is possible.

According to further embodiments, the first bearing and the first wedge are arranged at a first axial end region of the support structure. The second bearing and the second wedge are arranged at a second axial end region of the support structure. The second axial end region is arranged opposite to the first axial end region. Thus, an easy assembly of the wedges by sliding them along the longitudinal direction in opposite directions is possible. The removal of the wedges is also simplified. The second wedge is for example removable along a first axial direction. The first wedge is removable along a second axial direction. The first axial direction is opposite to the second axial direction.

Further embodiments of the disclosure provide a wind turbine. In particular, the wind turbine includes a nacelle. The wind turbine includes a bearing support arrangement according to at least one of the described embodiments. The wind turbine allows a simplified mounting and demounting of the bearings and of the rotor shaft without the need of changing the whole nacelle. Also maintenance of the bearing, the bearing housing and the rotor shaft is simplified.

Further embodiments of the disclosure provide a method for mounting a bearing support arrangement for a wind turbine, in particular for mounting a bearing support arrangement according to one of the described embodiments. According to an embodiment, the method includes:
  inserting a wedge along an axial direction between a support structure and a bearing housing, and thereby clamping a bearing between a rotor shaft and the bearing housing,
  fixing of the wedge to the support structure and/or the bearing housing.

The advantages and features described in connection with the bearing support arrangement also apply to the method and vice versa.

The method allows an easy and reliable clamping of the bearing, in particular without the need of heating solid components. Furthermore the components of the bearing support arrangement can be provided with larger tolerances.

According to further embodiments the method includes steps for removing the rotor shaft. To remove the rotor shaft the fixing of the wedge to the support structure and/or the bearing housing is released. The wedge is removed from the support structure along the axial direction of the support structure, in particular together with the rotor shaft, the bearing housing and the bearing. Thus, an assembly which for example includes the bearing housing, the bearing(s) and the rotor shaft is demounted after releasing of the wedge(s). The rotor shaft is removed out of the support structure along the axial direction of the support structure. In particular, the rotor shaft can be dismantled and removed non-destructively and without the need to heat the components. The removal of the wedges reduces the radial tension and the clamping of the components in order to allow the components to move with respect to each other along the axial direction.

For example, the method includes a tightening of fixing elements to fix the wedge. The method includes loosening of fixing elements to release the fixing. For example, screws are screwed in and tightened to fix the wedge and clamp the bearing. The screws are loosened and unscrewed to allow a removal of the wedge and to release the clamping of the bearing.

BRIEF DESCRIPTION OF THE DRAWINGS

The invention will now be described with reference to the drawings wherein.

DESCRIPTION OF THE PREFERRED EMBODIMENTS

Figure 1:
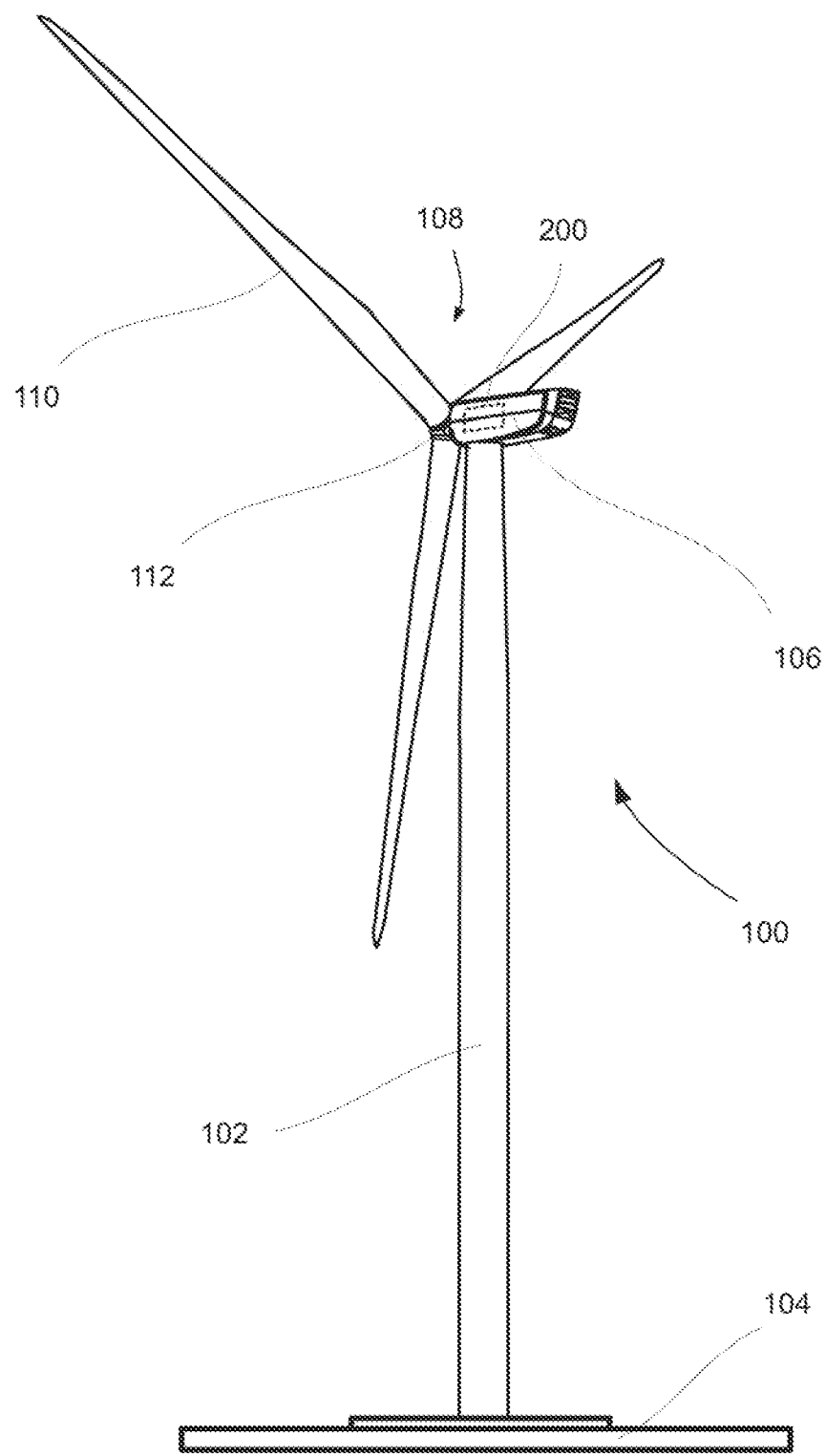
FIG. 1 is a schematic view of a wind turbine according to an embodiment.

As shown in FIG. 1 the wind turbine 100 includes a tower 102. The tower 102 is connected to a foundation 104 fixed on the ground. On a top end of the tower 102 opposite to the foundation 104 a nacelle 106 is arranged. The nacelle 106 houses the drive train. Inside the nacelle 106 for example a generator is arranged which is connected via a gearbox and a rotor shaft 205 with a rotor 108. The rotor 108 includes a rotor hub 112 and several rotor blades 110. The rotor blades 110 are mounted on the rotor hub 112. The rotor hub 112 is connected to the rotor shaft 205.

The rotor 108 is driven in operation by an air flow, for example wind. The rotational movement of the rotor 108 is transmitted via the rotor shaft 205 to the generator. The generator converts the energy of the rotor 108 into electrical energy.

Figure 2:
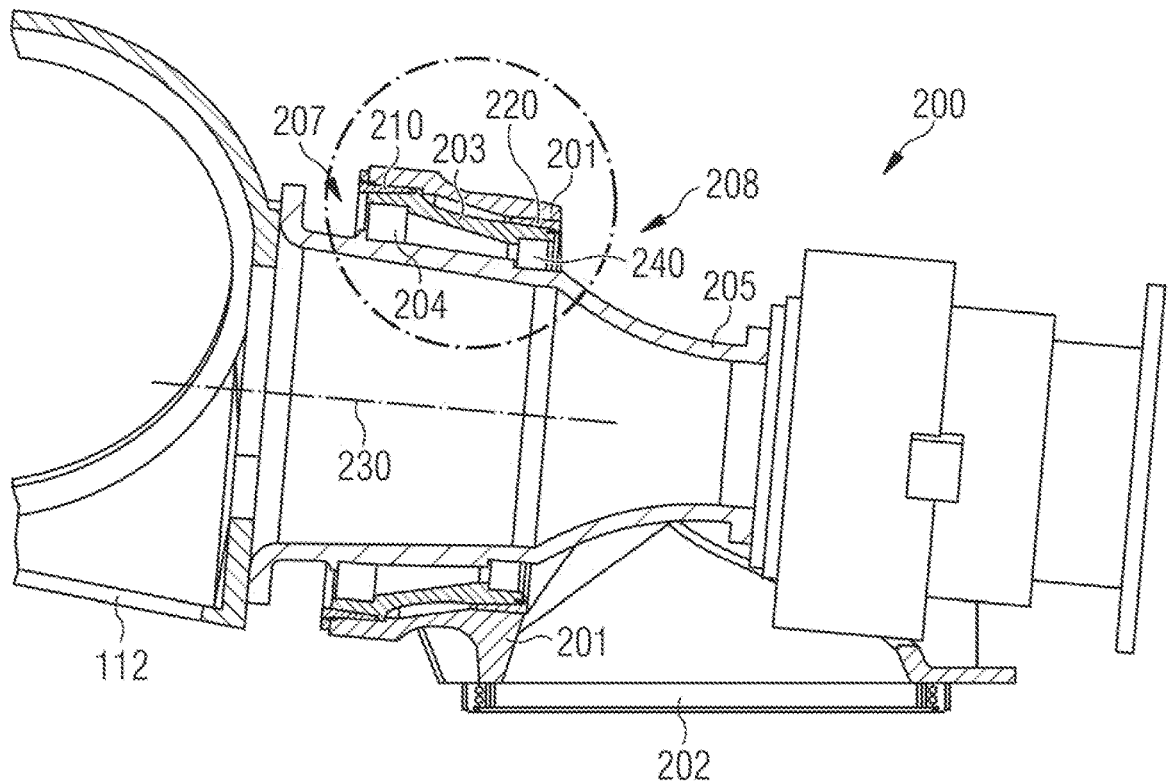
FIG. 2 is a schematic view of a drive train of the wind turbine according to an embodiment.
Figure 3:
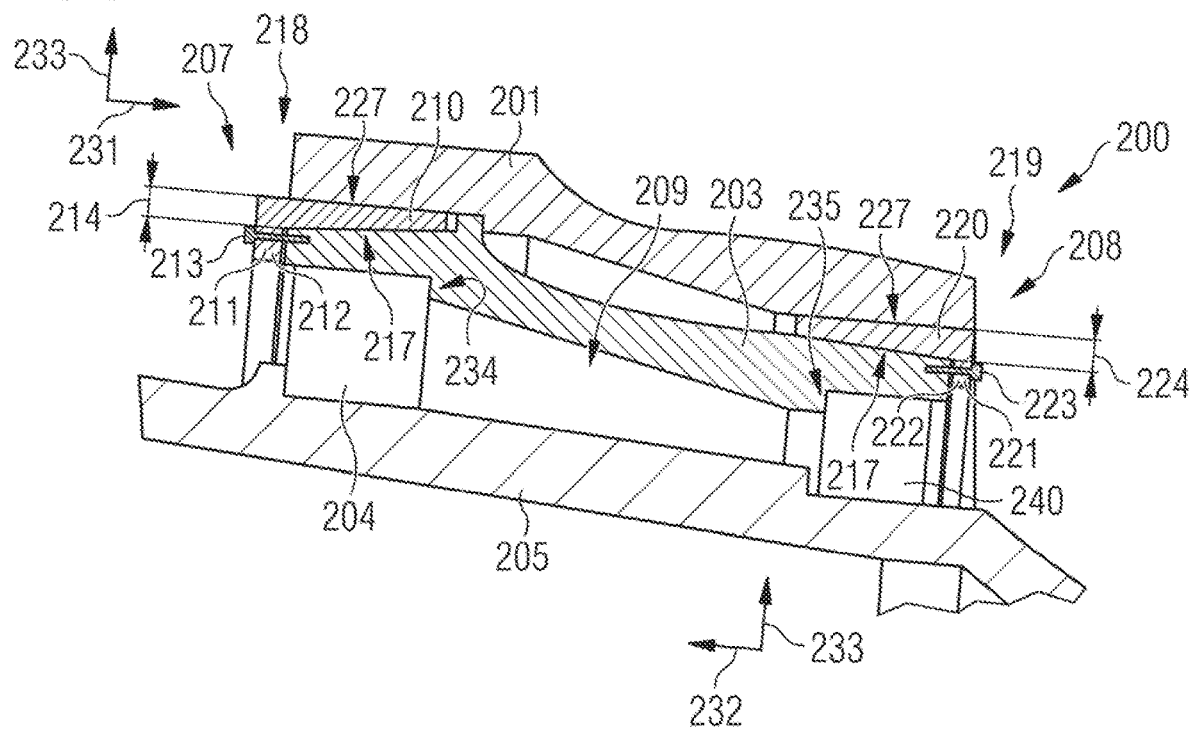
FIG. 3 is a schematic view of a bearing support arrangement according to the embodiment of FIG. 2.

As shown in FIG. 2 and in greater detail in FIG. 3, a bearing support arrangement 200 according to an embodiment includes a support structure 201 forming a machine frame realized with a first part surrounding a bearing housing 203 and a second part forming an interface to a yaw bearing 202. The first and the second part for example are formed as a one-piece component. The support structure 201 is screwed to the yaw bearing 202. The yaw bearing 202 is located at the top end of the tower 102 and enables the rotation of the support structure 201 and other components mounted to the support structure 201 with respect to a longitudinal axis of the tower 102. The support structure 201 is configured to hold and support the rotor shaft 205 of the wind turbine 100.

The support structure 201 surrounds the rotor shaft 205 at least in part. To allow a rotation of the rotor shaft 205 relative to the support structure 201, a bearing 204 is arranged between the rotor shaft 205 and the support structure 201. According to embodiments, two bearings 204 and 240 are provided to allow the rotational movement of the rotor shaft 205.

The bearing housing 203 surrounds the bearings 204, 240 radially opposite the rotor shaft 205. The bearing housing 203 is arranged between the support structure 201 and the bearings 204, 240. The bearings 204, 240 are arranged between the rotor shaft 205 and the bearing housing 203. To fix the bearings 204, 240 as well as the bearing housing 203 with respect to the support structure 201 wedges 210, 220 are provided.

The wedges 210, 220 each have a conical shape in a cross section along a longitudinal axis 230. The wedges 210, 220 have a ring like shape around the longitudinal axis 230. The wedges 210, 220 have a shape that allows to provide a clamping force and tensioning force along a radial direction 233 which is oriented transversely to the longitudinal axis 230.

The wedges 210, 220 are comparably structured and configured. For example, the wedges 210, 220 have different diameters to each other. For example, angles of a cone shape of the wedges 210, 220 can be the same or different to each other. The wedges 210, 220 clamp the bearing housing 203 and the bearings 204, 240 against the support structure 201 and against the rotor shaft 205.

The wedges 210, 220 are arranged between the support structure 201 and the bearing housing 203 along the radial direction 233. Starting from outside, the support structure 201 followed by the wedges 210, 220, the bearing housing 203, the bearings 204, 240 and the rotor shaft 205 are arranged coaxial with respect to the longitudinal axis 230. The functionality of the wedges 210, 220 to radially jam, clamp and hold the bearings 204, 240 is the same on both axial end regions 218, 219 of the support structure 201.

Features described in connection with one of the wedges 210, 220 may also apply for the other of the wedges 210, 220.

In order to clamp the bearing 204 against the rotor shaft 205 the wedge 210 is introduced between the bearing housing 203 and the support structure 201 along a first axial direction 231 at the first axial end region 218 of the support structure 201. The wedge 210 slides along a contact surface 227 of the support structure 201 and along a contact surface 217 of the bearing housing 203. The contact surface 227 is parallel to the longitudinal axis 230. The contact surface 217 is inclined such that a distance between the contact surface 217 and the contact surface 227 becomes smaller along the longitudinal axis 230 from an outer side 207 of the support structure 201 to an inner side 209 of the support structure 201. The shape of the contact surfaces 217 and 227 corresponds to the shape of the wedge 210. Due to the conical shape of the wedge 210 and the inclined contact surface 217 the radial force between the bearing 204 and the support structure 201 is realized.

According to embodiments, the contact surface 217 is not inclined as illustrated in FIG. 3. Instead, the contact surface 217 is parallel to the longitudinal axis 230. The contact surface 227 is then inclined such that a distance between the contact surface 217 and the contact surface 227 becomes smaller along the longitudinal axis 230 from an outer side 207 of the support structure 201 to an inner side 209 of the support structure 201. The wedge 210 is then shaped accordingly.

The wedge 210 has a thickness 214 along the radial direction 233. The thickness 214 becomes less along the first axial direction 231. Thus, the cone-like outer contour is achieved. The thickness 214 of the wedge 210 is greater on the side facing the outer side 207 of the support structure 201 than on the side facing the inner side 209 of the support structure 201.

The wedge 210 is held in position by a fixing element 213. The fixing element 213, for example, includes a multitude of screws that are aligned along the longitudinal axis 230. The fixing element 213 effects a holding force along the longitudinal axis 230.

The wedge 210 includes a mounting interface 211 that interacts with the fixing element 213. For example, the mounting interface is arranged outside the support structure 201. For example, the wedge 210 includes a radial projecting part 212. The radial projecting part 212 projects along the radial direction 233 to reach over the bearing housing 203. The radial projecting part 212 may be a flange or may be a multitude of spaced-apart projecting noses.

The fixing element 213 reaches through the mounting interface 211 to the bearing housing 203 to axially hold the wedge 210 in position.

The second bearing 240 is clamped between the bearing housing 203 and the rotor shaft 205 in a corresponding way. The second wedge 220 is pushed between the bearing housing 203 and the support structure 201 along a second axial direction 232. The first axial direction 231 and the second axial direction 232 are aligned opposite to each other. Due to the conical shape of the wedge 220 and the shape of the contact surface of the bearing housing 203 and the support structure 201, the wedge 220 effects a radial force between the support structure 201, the bearing housing 203 and the second bearing 240. The second wedge 220 is held in place by fixing elements 223 that reach through a radial projecting part 222 of a mounting interface 221 of the wedge 220. The fixing elements 223 connect the second wedge 220 to the bearing housing 203. The fixing elements 223 hold the second wedge 220 along the longitudinal axis 230.

The second wedge 220 has a thickness 224 along the radial direction 233. The thickness 224 becomes less along the second axial direction 232. Thus, the cone-like outer contour is achieved. The thickness 224 of the second wedge 220 is greater on the side facing the outer side 208 of the support structure 201 than on the side facing the inner side 209 of the support structure 201.

The bearing housing includes shoulders 234, 235 that function as alignment elements for the respective bearings 204, 240 along the longitudinal axis 230.

The fixing of the wedges 210, 220 can be realized in different ways. According to the embodiment of FIG. 4, which corresponds basically to the bearing support arrangements as described in connection with FIGS. 2 and 3, the wedge 210 for clamping the bearing 204 is fixed to the support structure 201. The corresponding fixing element 213 reaches through the projecting part 212 into the support structure 201. Therefore, the projecting part 212 projects outwardly along the radial direction 233.

The second wedge 220 is fixed to the bearing housing 203 as explained in connection with FIG. 3. Therefore the projecting part 222 projects inwardly along the radial direction 233.

Figure 4:
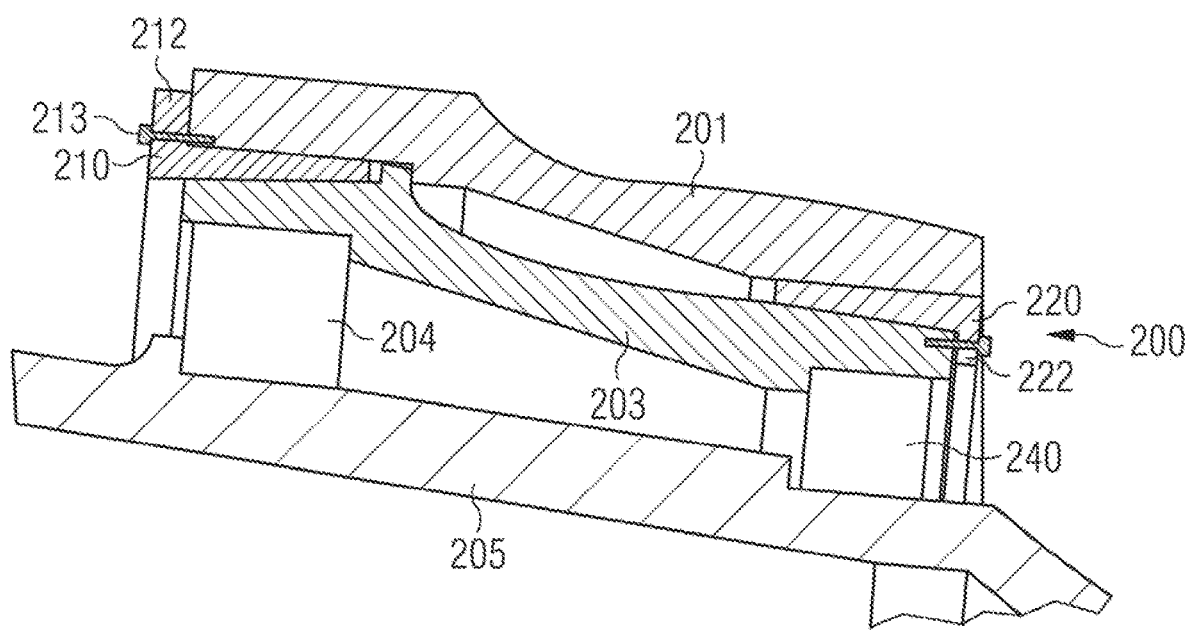
FIG. 4 is a schematic view of a bearing support arrangement according to an embodiment.

Different combinations of the fixing of the two wedges 210, 220 are possible. Both wedges 210, 220 can include inward projecting parts 212, 222 and can be fixed to the bearing housing 203 as shown in FIG. 3. Both wedges 210, 220 can include outward projecting parts 212, 222 and are both fixed to the support structure 201. According to further embodiments one of the wedges 210, 220 can be fixed to the support structure 201 and the other to the bearing housing 203, as shown in FIG. 4. It is also possible that the second wedge 220 for clamping the second bearing 240 is fixed to the support structure 201 via an outward projecting part 222 and the wedge 210 for clamping the first bearing 204 is fixed to the bearing housing 203 via an inward projecting part 212. It is also possible that one or both of the wedges are fixed to both the support structure 201 and the bearing housing 203.

Figure 5:
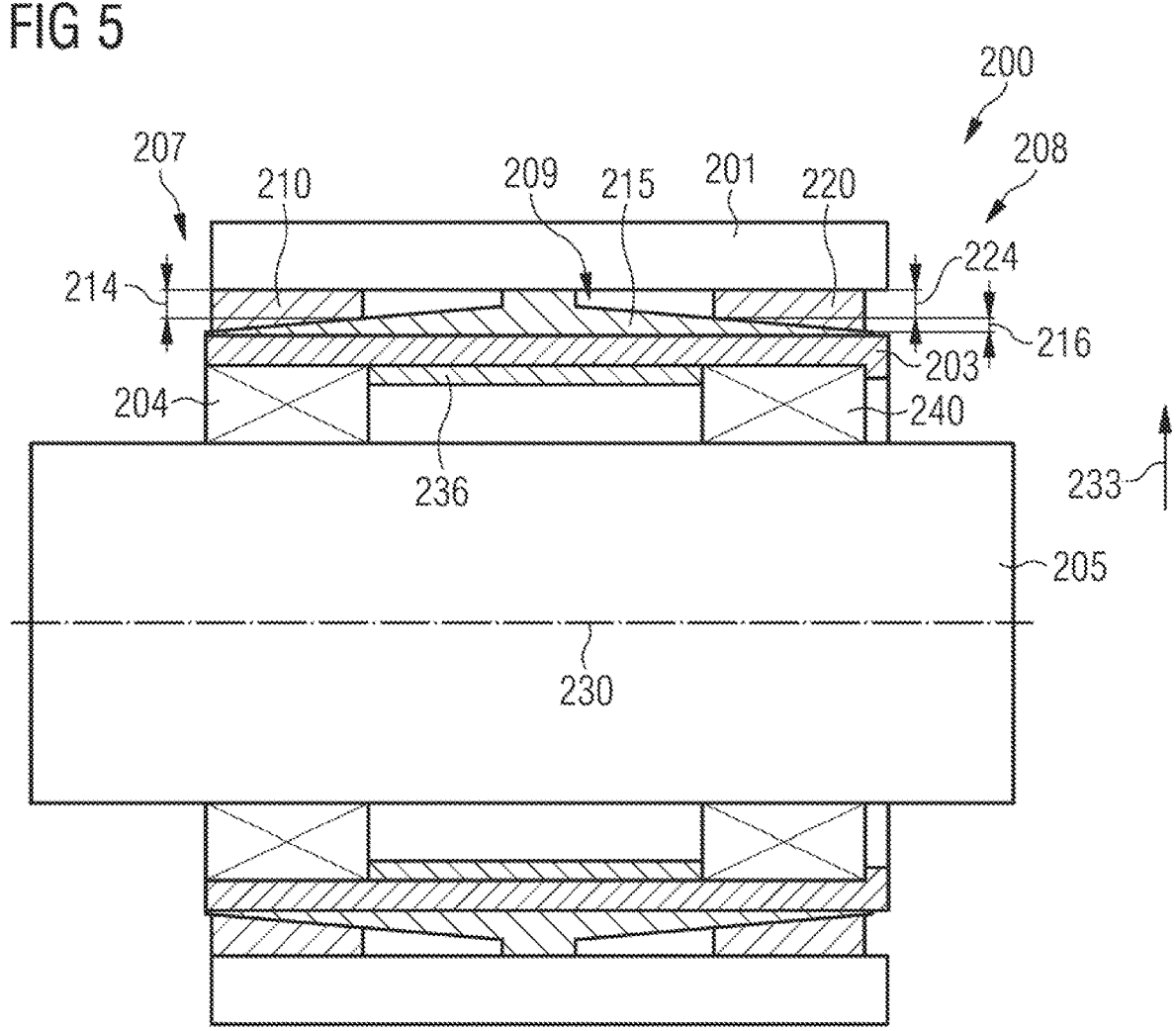
FIG. 5 is a schematic view of a bearing support arrangement according to an embodiment.

FIG. 5 shows the bearing support arrangement 200 according to a further embodiment. The bearing support arrangement 200 according to FIG. 5 corresponds basically to the bearing support arrangements as described above. In contrast the bearing support arrangement 200 according to the embodiment of FIG. 5 includes an additional cone ring 215.

The cone ring 215 is arranged between the wedges 210, 220 and the bearing housing 203 along the radial direction 233. The cone ring 215 has a radial thickness 216 along the radial direction 233. The radial thickness 216 increases from the outer side 207 in the direction to the inner side 209 along the longitudinal axis 230. From the inner side 209 to the outer side 207 the radial thickness 216 of the cone ring 215 decreases. The radial thickness 216 is smaller at the two axial ends of the cone ring 215 and is greater at the middle part of the cone ring 215. Thus, the cone ring 215 provides an inclined surface that interacts with the wedges 210, 220 to clamp the bearing 240. The inclined surfaces are not provided at the bearing housing 203 but at the extra component cone ring 215. This allows to use a conventional bearing housing 203 and to provide the clamping functionality via the wedges 210, 220 and the cone ring 215.

The bearings 204, 240 are held in place along the longitudinal axis 230 by a distance ring 236. The distance ring 236 is arranged between the bearing housing 203 and the rotor shaft 205 along the radial direction 233 and between the bearings 204 and 240 along the longitudinal axis 230. This makes it possible to provide the bearing housing 203 without the alignment shoulders 234, 235.

Figure 6:
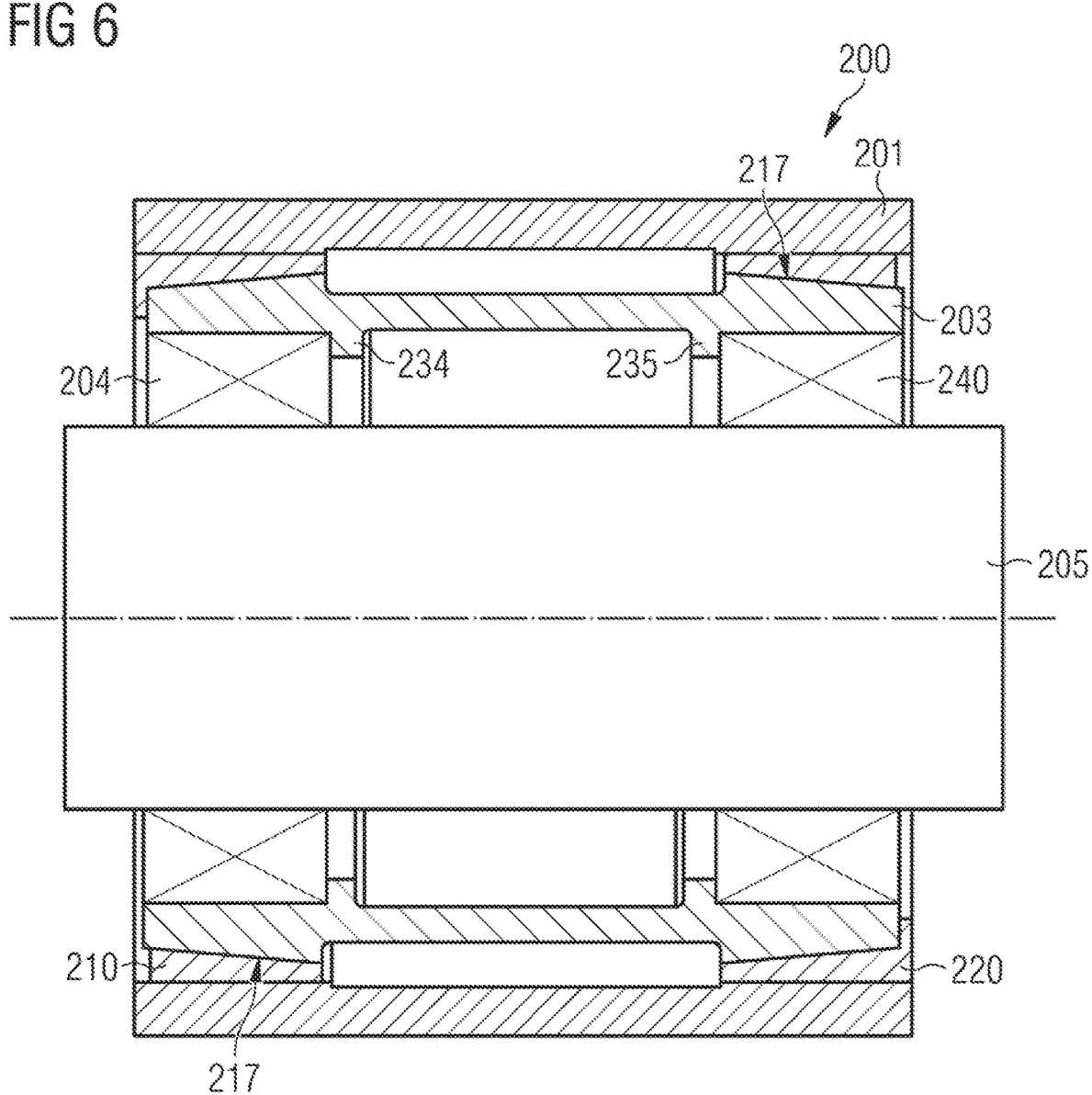
FIG. 6 is a schematic view of a bearing support arrangement according to an embodiment; and,
  FIGS. 7A and 7B are schematic views of the bearing support arrangement during dismantling according to embodiments.

FIG. 6 schematically shows an embodiment of the bearing support arrangement 200 which corresponds to the embodiment according to FIGS. 2 and 3. The bearing housing 203 is provided with shoulders 234 and 235 and the inclined contact surface 217. The wedges 210, 220 are spaced apart and are each clamped between the support structure 201 and the bearing housing 203.

A combination of the embodiments of FIGS. 5 and 6 is possible. For example, the cone ring 215 is provided to interact with the wedges 210, 220 for the clamping force. The bearing housing 203 includes two shoulders 234, 235 to provide an axial alignment of the bearings 204, 240.

Figure 7A:
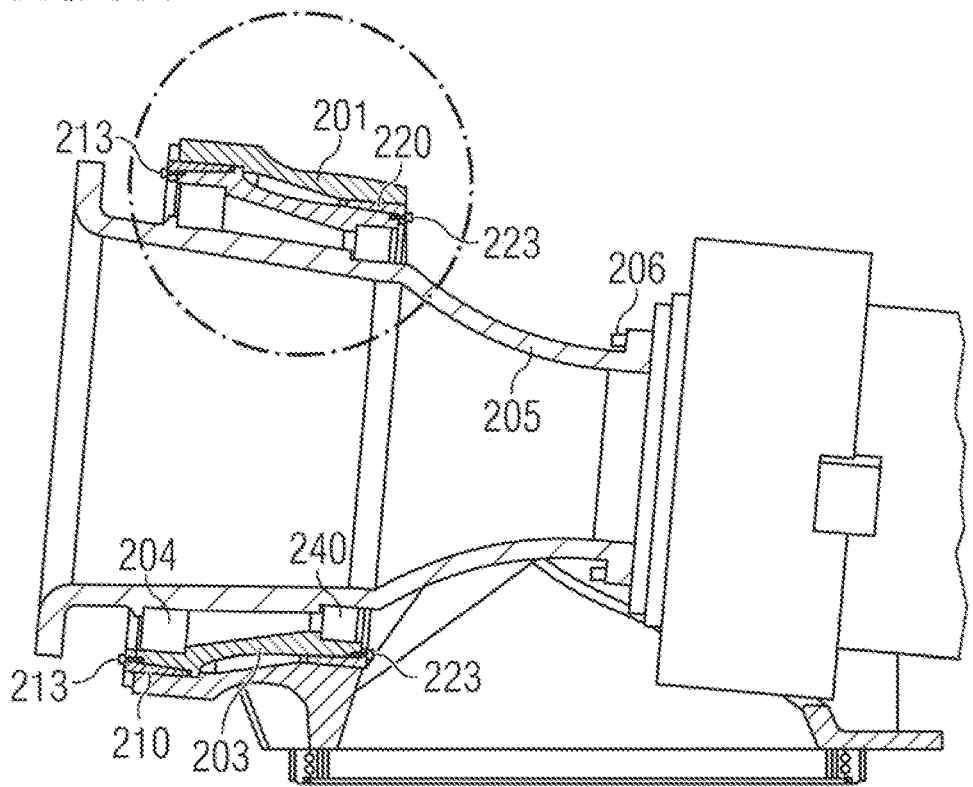
Figure 7B:
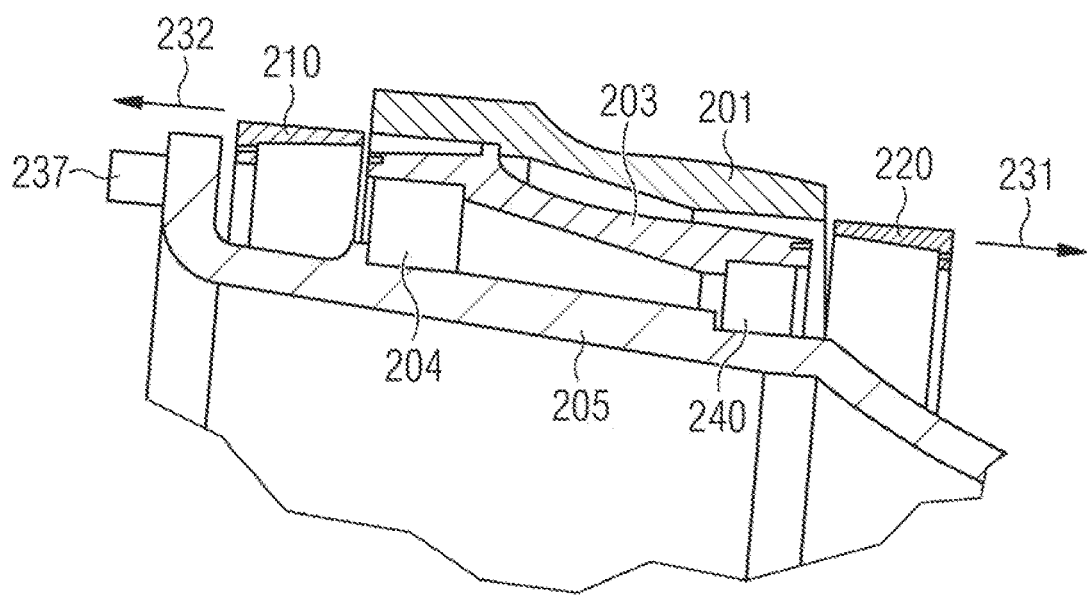

FIGS. 7A and 7B show a way of demounting the rotor shaft 205 from the support structure 201. The rotor shaft 205 is fixed to the generator or a gearbox or another element in between the rotor shaft 205 and the generator by fixing elements 206. These fixing elements are removed. Also fixing elements 213 and 223 holding the wedges 210, 220 are removed.

As shown in FIG. 7B wedge 210 is moved away from its operating position along the second axial direction 232. Thus, the wedge 210 is no longer between the support structure 201 and the bearing 204.

Correspondingly, the second wedge 220 is moved away from its operating position along the first axial direction 231. Thus, the second wedge 220 is no longer between the support structure 201 and the second bearing 240.

By removing the wedges 210, 220 the radial clamping force between the support structure 201, the bearing housing 203, the bearings 204, 240 and the rotor shaft 205 is reduced and loosened. This allows the rotor shaft 205 to be pulled out of the support structure 201. For example, the rotor shaft 205 includes an access point 237. For example, a crane can engage at the access point 237 and lift out the rotor shaft 205.

The wedges 210, 220 each include tapered shapes. The bearing housing 203 includes at least two seats for the bearings 204, 240. The bearing housing 203 and the seats can be manufactured precisely in one clamping. The bearing housing 203 together with the wedges 210, 220 is therefore capable of aligning the two main bearings 204, 240 to each other in an ideal tolerance position. Thus, a cone clamping connection is realized. In addition to transmitting torque the bearing support arrangement 200 primarily compensates for radial mounting play or radial manufacturing tolerance.

The bearing support arrangement 200 offers interchangeability, as the taper clamping connection can be loosened by means of screws. The bearing support arrangement 200 can be assembled, transported and exchanged in compact configuration and as a pre-assembly unit. In the case of a rotor lock in a closed support structure 201, the drive train, in particular the rotor shaft 205, is reliably positioned by the taper clamping connection of the bearing support arrangement 200. The bearing support arrangement 200 realizes a mechanical bracing of the bearings 204, 240 to the support structure 201. The bearing support arrangement 200 allows larger manufacturing tolerances in the support structure 201. The bearing support arrangement 200 ensures the functional tolerance chain in the drive train by centering the rotor shaft 205 to the support structure 201. The bearing support arrangement 200 allows a division into modules with permissible transport masses. The bearing support arrangement 200 can be dismantled in case of damage, for example a damage to the bearings 204, 240.

It is understood that the foregoing description is that of the preferred embodiments of the invention and that various changes and modifications may be made thereto without departing from the spirit and scope of the invention as defined in the appended claims.

REFERENCE NUMERALS 100 wind turbine
102 tower
104 foundation
106 nacelle
108 rotor
110 rotor blade
112 rotor hub
200 bearing support arrangement
201 support structure
202 yaw bearing
203 bearing housing
204 bearing
205 rotor shaft
206 fixing element
207, 208 outer side of the support structure
209 inner side of the support structure
210, 220 wedge
211, 221 mounting interface
212, 222 radial projecting part
213, 223 fixing elements
214, 224 radial thickness of the wedge
215 cone ring
216 radial thickness of the cone ring
217 contact surface of the bearing housing
218 first axial end region of the support structure
219 second axial end region of the support structure
227 contact surface of the support structure
230 longitudinal axis
231 first axial direction
232 second axial direction
233 radial direction
234, 235 shoulder
236 distance ring
237 access point
240 second bearing

What is claimed is:

1. A bearing support arrangement for a wind turbine, the bearing support arrangement comprising:
   a support structure;
   a bearing housing arranged within said support structure;
   a first bearing radially supported by said bearing housing;
   a rotor shaft radially supported by said first bearing;
   a first wedge being removable and arranged between said support structure and said bearing housing to clamp said first bearing between said rotor shaft and said bearing housing;
   a second bearing radially supported by said bearing housing; and,
   a second wedge being removable and being arranged between said support structure and said bearing housing to clamp said second bearing between said rotor shaft and said bearing housing.

2. The bearing support arrangement of claim 1, wherein said first wedge has an annular configuration and surrounds said first bearing.

3. The bearing support arrangement of claim 1, wherein said first wedge has a mounting interface for removably fixing said first wedge to at least one of said bearing housing and said support structure.

4. The bearing support arrangement of claim 3, wherein said mounting interface includes a radial projection extending to at least one of said bearing housing and said support structure.

5. The bearing support arrangement of claim 1, further comprising a plurality of first fixing elements for removably fixing said first wedge to at least one of said bearing housing and said support structure.

6. The bearing support arrangement of claim 1, wherein said bearing support arrangement defines a longitudinal axis; said support structure has an outer side and an inner side along said longitudinal axis; and, said first wedge has a radial thickness decreasing along said longitudinal axis from said outer side of said support structure toward said inner side of said support structure.

7. The bearing support arrangement of claim 1, further comprising:
   said bearing support arrangement defining a longitudinal axis;
   said support structure having an outer side and an inner side along said longitudinal axis;
   a cone ring arranged radially between said bearing housing and said first wedge; and,
   said cone ring having a radial thickness increasing along said longitudinal axis from said outer side of said support structure toward said inner side of said support structure.

8. The bearing support arrangement of claim 1, wherein said bearing support arrangement defines a longitudinal axis; at least one of said bearing housing and said support structure defines a contact surface in contact with said first wedge; and, said contact surface is inclined with respect to said longitudinal axis.

9. The bearing support arrangement of claim 1, wherein:
   said support structure has a first axial end and a second axial end lying opposite each other; and,
   said first bearing and said first wedge are arranged at said first axial end of said support structure and said second bearing and said second wedge are arranged at said second axial end of said support structure.

10. The bearing support arrangement of claim 1, wherein said first wedge is removable along a first axial direction and said second wedge is removable along a second axial direction; and, said first and second axial directions are opposite to each other.

11. The bearing support arrangement of claim 10, wherein said rotor shaft is rotatable relative to said support structure and said bearing housing.

12. A wind turbine, comprising:
   a nacelle; and,
   a bearing support arrangement arranged within said nacelle;
   said bearing support arrangement including:
   a support structure;
   a bearing housing arranged within said support structure;
   a first bearing radially supported by said bearing housing;
   a rotor shaft radially supported by said first bearing;
   a first wedge being removable and arranged between said support structure and said bearing housing to clamp said first bearing between said rotor shaft and said bearing housing;
   a second bearing radially supported by said bearing housing; and,
   a second wedge being removable and being arranged between said support structure and said bearing housing to clamp said second bearing between said rotor shaft and said bearing housing.

13. The wind turbine of claim 12, wherein said wind turbine includes a rotor hub having rotor blades mounted thereon and said rotor shaft is connected to said rotor hub.

14. The wind turbine of claim 13, further comprising a tower and said support structure being rotatably mounted atop said tower.

15. A method for mounting a bearing support arrangement for a wind turbine, the method comprising:
- inserting a first wedge along a first axial direction between a support structure and a bearing housing, and thereby clamping a first bearing between a rotor shaft and the bearing housing;
- fixing the first wedge to at least one of the support structure and the bearing housing;
- inserting a second wedge along a second axial direction between the support structure and the bearing housing, and thereby clamping a second bearing between the rotor shaft and the bearing housing;
- fixing the second wedge to at least one of the support structure and the bearing housing.

16. The method of claim 15, further comprising: tightening of fixing elements to fix the first wedge.

17. A method for removing a rotor shaft from a bearing support arrangement for a wind turbine, the bearing support arrangement including a support structure; a bearing housing arranged within said support structure; a first bearing radially supported by the bearing housing; a rotor shaft radially supported by the first bearing; a first wedge being removable and arranged between the support structure and the bearing housing to clamp the first bearing between the rotor shaft and the bearing housing; a second bearing radially supported by the bearing housing; and, a second wedge being removable and being arranged between said support structure and said bearing housing to clamp said second bearing between said rotor shaft and said bearing housing; a first removable fixing for securing said first wedge to at least one of said bearing housing and said support structure; a second removable fixing for securing said second wedge to at least one of said bearing housing and said support structure; and,
- for removing the rotor shaft, the method comprising:
  - releasing the first removable fixing of the first wedge to at least one of the support structure and the bearing housing;
  - releasing the second removable fixing of the second wedge to at least one of the support structure and the bearing housing;
  - removing the first wedge along an axial direction between the support structure and the bearing housing;
  - removing the second wedge along a further axial direction between the support structure and the bearing housing; and,
  - removing the rotor shaft out of the support structure.

18. The method of claim 17, further comprising loosening of the first and second removable fixing to release the first and second removable fixing.

* * * * *

UNITED STATES PATENT AND TRADEMARK OFFICE
CERTIFICATE OF CORRECTION

PATENT NO. : 11,761,430 B2
APPLICATION NO. : 17/534195
DATED : September 19, 2023
INVENTOR(S) : I. Muhamad et al.

Page 1 of 1

It is certified that error appears in the above-identified patent and that said Letters Patent is hereby corrected as shown below:

In the Claims

<u>In Column 10</u>:
Line 46: delete "10" and insert -- 1 -- therefor.

<u>In Column 11</u>:
Line 18: add -- and, -- after housing.

Signed and Sealed this
Fifth Day of December, 2023

Katherine Kelly Vidal
*Director of the United States Patent and Trademark Office*